Figure 1:
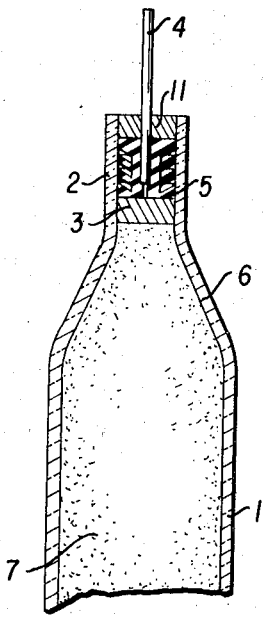

United States Patent [19]
Eisenbeiss et al.

[11] 3,791,522
[45] Feb. 12, 1974

[54] CHROMATOGRAPHIC READY-FOR-USE COLUMNS

[75] Inventors: Friedhelm Eisenbeiss; Susanne Ehlerding, both of Darmstadt, Germany

[73] Assignee: Merck Patent Gesellschaft mit beschrankter Haftung, Darmstadt, Germany

[22] Filed: June 20, 1972

[21] Appl. No.: 264,607

[30] Foreign Application Priority Data
July 1, 1971 Germany............................ 2132686

[52] U.S. Cl. .............................. 210/198 C, 55/386
[51] Int. Cl. .......................................... B01d 15/08
[58] Field of Search ...... 55/67, 197, 386; 210/31 C, 210/198 C; 252/232 C, 259, 292

[56] References Cited
UNITED STATES PATENTS
3,511,377  5/1970  Hadina................................ 55/386
3,250,395  5/1966  Blume............................... 23/292 X
3,578,785  5/1971  Patterson.......................... 55/197 X OTHER PUBLICATIONS
Chromatography by Heftmann; pgs. 56 and 57 relied on, 1961, Reinholm Pub.

*Primary Examiner*—John Adee
*Attorney, Agent, or Firm*—Millen, Raptes & White

[57] ABSTRACT

A ready-to-use chromatographic column packed with an adsorbent and both ends of which narrow into a shorter column having a smaller diameter into which is fitted a distributing filter, which is tightly packed against the adsorbent; a bored stopper, which is positioned against the distributing filter; and a capillary tube fitted in the bore of the stopper, one end of which extends beyond the end of the shorter column and the other in the interior of the bored stopper. These columns are convenient devices for adsorption and partition chromatography.

10 Claims, 2 Drawing Figures

3,791,522

CHROMATOGRAPHIC READY-FOR-USE COLUMNS

BACKGROUND OF THE INVENTION

This invention relates to ready-to-use chromatographic columns.

Chromatography is an important method for the purification of chemical compounds and the separation of mixtures. However, the original technique of chromatography, viz., column chromatography of liquid phases, is nowadays used predominantly for ion exchangers and gel chromatographic separations and only rarely for adsorption and partition chromatography. In this latter area, thin layer chromatography has become far more important. The main reasons for the rare use of the column chromatographic technique in adsorption or partition chromatography are the difficulties in the preparation of well-distributed adsorbent packings, and the poor reproducibility of separations obtained with such packings. Further, there are frequently difficulties in applying the substances to be separated smoothly to conventional columns.

It is an object of this invention to provide novel ready-to-use chromatographic columns. It is a further object of this invention to provide ready-for-use chromatographic columns useful for column chromatography of liquid phases which have reproducible adsorbent packings of optimal particle size and which permit smooth application of the sample to be chromatographed even to the surface of columns of large diameters. Other objects will be apparent to those skilled in the art to which this invention pertains.

SUMMARY OF THE INVENTION

The novel products of this invention are ready-to-use chromatographic columns packed with an adsorbent and both ends of which narrow into a shorter column having a smaller diameter into which is fitted a distributing filter, which is tightly packed against the adsorbent; a bored stopper, which is positioned against the distributing filter; and a capillary tube fitted in the bore of the stopper, one end of which extends beyond the end of the shorter column and the other in the interior of the bored stopper. These columns are convenient devices for adsorption and partition chromatography.

DETAILED DISCUSSION

The novel chromatographic columns are filled with an adsorbent, with both ends of the column merging conically into shorter columns having a smaller diameter than the portion containing the adsorption agent. The packing of the adsorbent extends to the narrower parts of the column and is maintained in the column by distributing filters packed against the surface of the adsorption packing. A stopper bearing a capillary tube is fitted into the narrower portions, which stopper rests against the distributing filter. Optionally, a seal can be attached beyond the stopper to prevent accidental pulling out of the stopper.

It has been found that the columns according to this invention can be handled easily and safely, and that reproducible results can be obtained with them.

Figure 2:
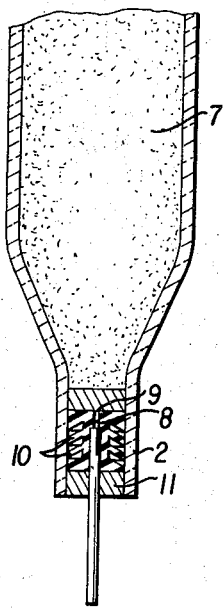
Figure 2:
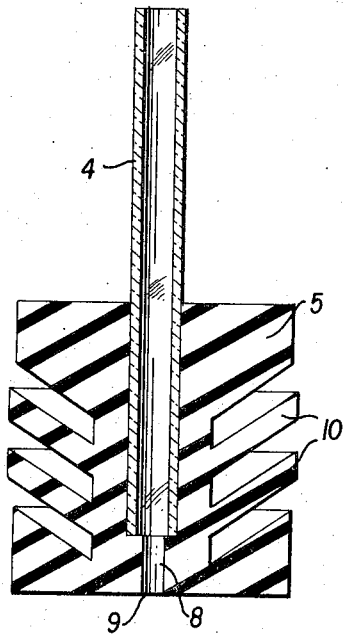

With reference to the accompanying drawings, which show a preferred form of the construction of the ready-for-use columns according to the invention, FIG. 1 is a longitudinal cross-sectional view of such a column, and FIG. 2 is an enlarged cross-sectional view of the stopper with capillary tube mounted therein which is fitted in each end of the chromatographic column.

As shown in the drawings, the chromatographic column has a main column portion 1 packed with a chromatographic adsorbent 7 which merges via conical passages 6 into shorter columns 2 having a smaller diameter than the main column 1. Holding the adsorbent packing 7 in the main column is a pair of distributing filters 3. Fitted against each filter is a stopper 5 containing a borehole 8, into which a capillary tube 4 is fitted with one end extending beyond the end of the shorter column 2 and the other in the interior of the stopper so that it does not reach the mouth 9 of the borehole 8. The stoppers 5 are locked in the narrower column parts 2 by means of elastic lips 10. The stoppers 5 are locked in the ends of the column by additional seals 11 through which the capillary tubes 4 extend.

The main column 1 is a rigid casing containing the packing 7 of the adsorbent. It is mostly of cylindrical shape, and merges on both ends conically into the shorter column parts 2 having a smaller diameter. The material of the column must have supportive mechanical strength and be inert against the solvents and developing reagents usually used in chromatography. Glass, plastics, e.g., polytetrafluoroethylene, polyvinylchloride, polyethylene and polyethylene terephthalates, metals, e.g., stainless steel, ceramic substances or quartz may be used. If it is desired to permit UV absorbing substances in the column to be visible, special UV permeable glass or quartz glass can be used.

The length of the main column 1 can be varied within a wide range according to the intended use. Long columns are used if larger amounts or if substances with similar chromatographic properties are to be separated. Columns of from 10 to 80 cm. length, preferably of 20 to 40 cm., are particularly easily handled. The diameter of the main column is desirably from 0.5 to 3 cm., preferably about 1 to 2 cm. In a preferred embodiment of the ready-for-use columns of this invention, the ratio of the diameter of the main column 1 to the diameter of the narrower end parts 2 is from 2:1 to 5:1, preferably about 3:1.

The shorter, narrower column ends or parts 2 are usually made from the same material as the main column 1. The column parts 2 are preferably identically shaped at both ends of the column.

The conical portions 6 connecting the main column 1 with the narrower columns 2 have an inclination from 15° to 60°, preferably 30°, so that the angle between the side wall of the main column 1 and that of the conical passage 6 preferably is 150°.

The distributing filter 3 is placed directly against the adsorbent packing 7 without leaving any dead space. The diameter of this distributing filter 3 is the same as the inner diameter of the narrower column parts 2 so that the filters fit snugly in the narrower parts. The distributing filter must be formed of a material which is inert to the solvents used for the chromatography and must be sufficiently and uniformly permeable to the chromatographic liquids, usually solutions, which are applied to the column. Suitable materials are, for example, sea sand, quartz sand, porous ceramic substances or filter cardboard. Porous ceramic substance filters are appropriately of cylindrical shape, with a height of about one-half of their diameter. Filter cardboard is preferably used in the form of filter disks.

The closing stoppers 5 must rest tightly against the distributing filters 3. They are therefore constructed in a manner which permits tight sealing of the ends 2 of the column 1. The stoppers 5 are preferably provided with means which compensate for any unevenness of the inner surface of the narrower column parts 2. According to the preferred form shown in the drawings, the stopper is equipped with elastic lips 10 at least at its center position, the outer diameter of which slightly exceeds the outer diameter of the rest of the stopper and the inner diameter of the column 2. These lips are slanted towards the outer end of the stopper, so that shoving the stopper 5 into the column 2 presses the lips tightly against the inner walls of the column 2. The stoppers are thereby additionally locked against their accidental slipping out of the column 2. The stoppers 5 are preferably made of a material chemically inert to the chromatographic solutions conventionally employed, e.g., polytetrafluoroethylene. The inner diameter of the borehole 8 corresponds to the outer diameter of the capillary 4 to be inserted therein and preferably is slightly smaller so that the capillary tube 4 is fitted in the borehole 8 firmly and immovably. The capillary tube 4 is fitted in the borehole so that one end juts out of the stopper beyond the end of the column and the other ends within the stopper before reaching the mouth 9 of the borehole 8 which faces the distributing filter 3. It is important that the capillary 4 does not reach the mouth 9 of the borehole 8 in order to avoid any accidental damage of the distributing filter 3 when connecting solution tubing is slipped on the capillary tubes 4. To be on the safe side, the end of the capillary tubes should be positioned at least 1 mm. inside of the borehole 8 and away from its mouth 9. The capillary tubes 4 which serve as an inlet for the solutions to be chromatographed and the eluents, and for the outlet of the effluent, respectively, preferably have an inner diameter of from 0.3 to 2 mm. As they are strongly mechanically stressed during slipping on the pipes, they must be made of a rigid material, e.g., stainless steel, high strength, e.g., cured, plastic, or thick walled glass tubing. The length of the capillary tubes 4 is not critical as long as they extend beyond the end of the column end 2 enough to permit tubing to be fitted thereon. Preferably, their length is from 10 to 60 mm. In order to avoid any accidental removal or loosening of the stoppers 5, the column ends 2 can be closed additionally by a seal 11 through which the capillary tube 4 extends. Sealing is most easily carried out by filling the space above the stopper 5 with a liquid or semi-solid mass which is capable of subsequently solidifying thereafter, and thus warrants a rigid closing. Preferably, commercial sealing compounds or fillers are used, such as, for example, polyester based casting resins or silicon caoutchoucs.

The ready-for-use columns according to the invention can be filled with any adsorption agent. Non-swellable adsorbents such as, for example, silica gel, alumina, activated carbon or metal oxides, are filled in the columns in dry state, while swellable adsorbents, such as, for example, polyamides, cellulose or polymeric gels, are filled in the columns in their swollen state. By proper choice of the grain size range of the adsorbent, selective separations are allowed at good flow rates. Thus, adsorbents with a grain size of 30 to 65, preferably 50 micron, are particularly suitable for columns having diameters of about 30 mm., while adsorbents with a grain size of 70 to 100, preferably 80 micron are preferably used in columns of 40 mm diameter, in order to achieve good separations at favorable flow resistance values.

The special design of the column of this invention allows an exact and absolutely uniform application of the substance to be separated to the adsorbent, even in columns of large diameters. By means of the distributing filter 3, the mixture to be separated, which usually is in the form of a solution, is uniformly distributed over the whole surface of the adsorbent in the column end part 2. By a following continuous flow of the eluent, the components of the mixture are uniformly distributed within the adsorbent, while the increase of the column diameter in the conical part 6 of the column usually causes a narrowing of the zones of the components. It is, however, extremely important, that the inner face of the stopper 5 be in contact with the outer face of the distributing filter 3 and the inner face of the latter be in contact with the surface of the adsorbent packing 7 without any dead spaces. The distributing filter 3 prevents the formation of a concentration cone in the adsorbent during the application of the substance to be separated, and it also prevents any irregular or too fast flowing off of the solvent or eluent along the inner walls of the column. It is, of course, necessary that the adsorbent packing is uniform and reproducible, which preferably is achieved by mechanical filling.

The column is preferably symmetrical along both its longitudinal and transverse axes so that the column functions the same irrespective of which end is up.

The ready-for-use columns of this invention for the first time allow reproducible separations. It is even possible to verify results obtained by thin-layer chromatography on the column. The obtainable plate-heights are comparable with those which are obtained with the high pressure liquid chromatography.

The new columns can be used for separations in the analytical, preparative and biochemical fields. The handling of the new ready-for-use columns is very easy. They can be connected with all common types of chromatographic equipment, even with the application of pressure. They can also be used without any additional equipment, the eluent flowing into the column by its own hydrostatic pressure only. The columns can be used in dry or wet state, and for particular separation problems, they even can be used several times until the capacity of the adsorbent is exhausted. Several columns according to the invention can be series-connected or parallel-connected to larger units. In such larger units, the columns can contain identical or different adsorbents, and can be of identical or different length and/or diameter. Pre-columns can be easily fitted in.

The ready-for-use columns according to the invention allow outstanding separations with shorter column lengths than heretofore known. A test run with a mixture of benzene, naphthalene, phenanthrene, and perylene, wherein the UV absorption of the effluent was registered against the time gave a symmetrical plot which proves the absolutely parallel moving of the zones through the adsorbent.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A ready-for-use chromatographic column comprising a main column packed with a chromatographic adsorbent, each end of the main column communicating via a conical passage with a shorter column of smaller diameter, a distributing filter fitted in each of the shorter columns and tightly packed against the adsorbent, and a bored stopper, at least the center portion of which is fitted with elastic lips, fitted in the end of each of the shorter columns against the distributing filter therein, and a capillary tube fitted in the bore of each stopper, one end thereof extending beyond the end of the shorter column and the other end terminating in the interior of the stopper.

2. A column according to claim 1 wherein the ratio of the diameter of the main column to the diameter of each of the shorter columns is from 2:1 to 5:1.

3. A column according to claim 1 wherein the conical passages have an inclination of from 15° to 60°.

4. A column according to claim 1 wherein the capillary tubes are rigidly mounted in the bored stoppers with one end thereof terminating at least 1 mm. from the interior face of the bored stopper.

5. A column according to claim 4 wherein each of the shorter columns is further sealed near the open end thereof by a plug through which the capillary in the shorter column extends.

6. A column according to claim 1 wherein the inner diameter of the capillary tubes is from 0.3 to 2 mm.

7. A column according to claim 1 wherein the distributing filter is formed of a porous ceramic material.

8. A column according to claim 1 wherein the distributing filter is formed of filter cardboard.

9. A column according to claim 1 wherein the column is symmetrical in both its transverse and longitudinal axes.

10. A column according to claim 5 wherein the ratio of the diameter of the main column to the diameter of each of the shorter columns is from 2:1 to 5:1, wherein the conical passages have an inclination of from 15° to 60°, wherein the inner diameter of the capillary tubes in from 0.3 to 2 mm, and wherein the distributing filter if formed of porous ceramic material or filter cardboard.

* * * * *